United States Patent [19]

Mielke

[11] Patent Number: 5,074,264
[45] Date of Patent: Dec. 24, 1991

[54] LIGHT ALLOY PISTON FOR INTERNAL COMBUSTION ENGINES

[75] Inventor: Siegfried Mielke, Neckarsulm, Fed. Rep. of Germany

[73] Assignee: Kolbenschmidt AG, Neckarsulm, Fed. Rep. of Germany

[21] Appl. No.: 652,456

[22] Filed: Feb. 7, 1991

Related U.S. Application Data

[63] Continuation of Ser. No. 444,599, Dec. 1, 1989, abandoned.

[30] Foreign Application Priority Data

Dec. 3, 1988 [DE] Fed. Rep. of Germany ....... 3840841

[51] Int. Cl.$^5$ .............................................. F01B 31/00
[52] U.S. Cl. .................................... 123/193 P; 92/208
[58] Field of Search .............. 123/193 P; 92/208, 234, 92/237

[56] References Cited

U.S. PATENT DOCUMENTS

| | | | |
|---|---|---|---|
| 2,462,550 | 2/1949 | Ramspeck | 92/208 |
| 2,863,707 | 12/1958 | Lengnick | 92/208 |
| 2,963,329 | 12/1960 | Scherenberg | 92/208 |
| 3,179,021 | 4/1965 | Holcombe | 92/208 |
| 4,704,950 | 11/1987 | Ripberger | 92/208 |
| 4,809,591 | 3/1989 | Rhodes et al. | 92/208 |

FOREIGN PATENT DOCUMENTS 1292807 10/1972 United Kingdom ............... 92/208

Primary Examiner—Andrew M. Dolinar
Assistant Examiner—M. Macey
Attorney, Agent, or Firm—Sprung Horn Kramer & Woods

[57] ABSTRACT

In a light alloy piston for internal combustion engines the mounting for the piston pin is designed for heavy loads. The piston comprises piston pin bosses which are integrated in the skirt of the piston and provided with an inelastic block support. In order to reduce the weight those end faces of the piston pin bosses which face the small end of the connecting rod are outwardly setback below those segments of the top apex portions of the bosses which include an angle of less than 180 degrees.

4 Claims, 1 Drawing Sheet

LIGHT ALLOY PISTON FOR INTERNAL COMBUSTION ENGINES

This application is a continuation of application Ser. No. 444,599, filed Dec. 1, 1989, now abandoned.

This invention relates to a light alloy piston for internal combustion engines, in which the means for mounting the piston pin are designed for high loads and comprise piston pin bosses which are integrated in the piston skirt and are provided with an inelastic block support having a small elongation length, wherein the small end of the connecting rod has a width amounting to 15 to 50% of the piston diameter and the piston pin has a diameter amounting, to 20 to 45% of the piston diameter and a length of 50 to 85% of the piston diameter.

The forces exerted on a piston for internal combustion engines are applied by the top of the piston via the piston pin bosses to the piston pin and then via the connecting rod to the crankshaft. The piston pin bosses belong to those portions of the piston which are subjected to the highest stresses. For this reason their design and the dimensions of the piston pin are of essential significance for the load-carrying capacity of the piston. The piston pin will float if it can rotate in the small end of the connecting rod and in the piston pin bosses. The floating piston pin will axially be fixed by retaining rings, which are inserted into suitable grooves at the outer rim of the bores in the piston pin bosses. In a different pin mounting the piston pin is fixed in the small end of the connecting rod as a shrink fit. In that case there is no need for a bearing bushing in the small end of the connecting rod and for retaining rings in the piston pin bosses.

In light alloy pistons the piston pin bosses are usually integrated in the skirt of the piston with one exception, in which the piston pin bosses are suspended from ribs and project freely to support the top of the piston and are laterally connected to the skirt of the piston by thin ribs. In conjunction with a small width of the small end of the connecting rod and a correspondingly short length of the piston pin that arrangement of the piston pin bosses will save weight in a light alloy piston that is subjected to moderate loads.

Piston pin bosses in various forms may be used to ensure that the top of the piston will be supported for a proper transmission of forces and in said forms the piston pin bosses may have designs which are optimum from the aspect of weight if certain boundary conditions are complied with. For high loads resulting from the igniting pressure, it is known to provide diesel and spark ignition engines with light alloy pistons in which the piston pin bosses are integrated in the skirt of the piston and support the top of the piston by an inelastic block support having a small elongation length amounting to 10 to 15% of the piston diameter. Diesel engine pistons for very high loads have as a modification of the block support a so-called wedge-type support, in which the blocklike support and those end faces of the piston pin bosses which face the small end of the connecting rod are outwardly inclined by an angle of 8 to 15 degrees and the small end of the connecting rod is beveled in adaptation to such a design. Owing to the partial overlap of the bearing surfaces, that design will decrease the bending stress in the piston and the piston pin and the load-carrying capacity will be increased by up to 15%.

The desire for internal combustion engines having a low fuel consumption has resulted in the requirement to reduce the weight of light alloy pistons in which the piston pin mounting is designed for heavy loads and comprises piston pin bosses which are integrated in the piston skirt and are provided with an inelastic block support having small elongation length so that the resulting reduction in weight may possibly permit a secondary reduction of the weight of the internal combustion engine and a lighter weight of the vehicle resulting in a further decrease of the fuel consumption. But the other mechanical properties must not be adversely affected.

SUMMARY OF THE INVENTION

In the light alloy piston described first hereinbefore that object is accomplished in accordance with the invention in that the piston pin bosses have outwardly setback end faces, which face the small end of the connecting rod and are disposed below those segments of the top apex portions of the bosses which include an angle of less than 180 degrees and are disposed on both sides of the plane which includes the axis of the piston pin and the axis of the piston.

In the specific embodiment the segments of the top apex portions of the bosses include an angle of 70 to 150 degrees, preferably 76 to 96 degrees.

In addition to a saving of weight of 5 to 15% compared with a conventional light alloy piston having a block support or wedge-type support the piston pin bosses of the light alloy piston designed in accordance with the invention have the same load-carrying capacity as piston pin bosses which have oil pockets and in which large-area recesses in the lateral portions of the bores of the piston pin bosses not only improve the lubrication but also reduce the peripheral stresses in the piston pin bosses so that the risk of a cleaving fracture of the piston pin bosses is reduced.

In accordance with a further feature of the invention the piston pin bosses are disposed below the segments of the top apex portions of the bosses and each of said bosses is set back by 5 to 80% of the length in which the piston pin contacts the piston pin boss.

In order to optimize the variation of the compressive stresses resulting from gas forces exerted on the piston pin support designed in accordance with the invention the transitional portion between the outwardly setback portions of the piston pin bosses and the piston pin boss portions adjacent to the top apex of the boss is rounded with a radius of 1.5 to 12 mm.

An example of the light alloy piston designed in accordance with the invention is shown on the drawing and will be explained more in detail hereinafter.

DETAILED DESCRIPTION OF THE INVENTION

Figure 1:
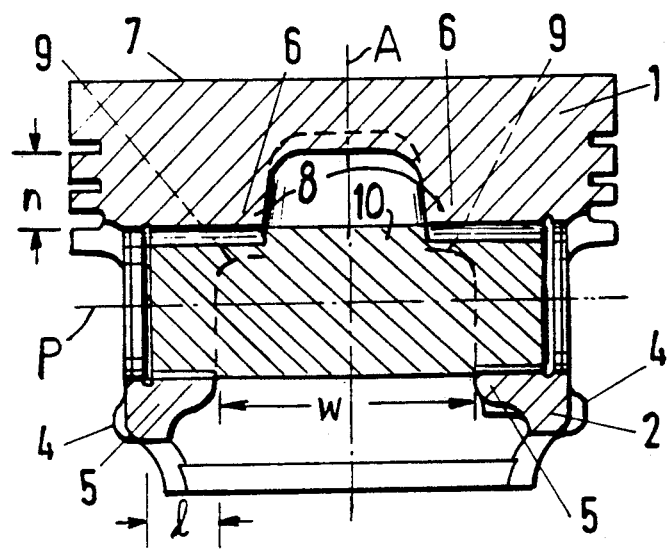
FIG. 1 is a sectional view showing the light alloy piston and taken on a plane which contains the piston axis and the axis of the piston pin.
Figure 2:
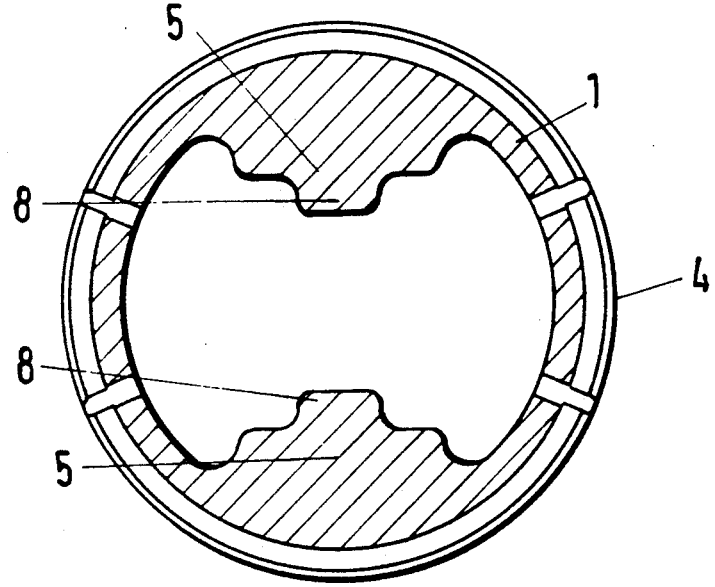
FIG. 2 is a sectional view taken on the plane of the oil ring groove of the light alloy piston.
Figure 3:
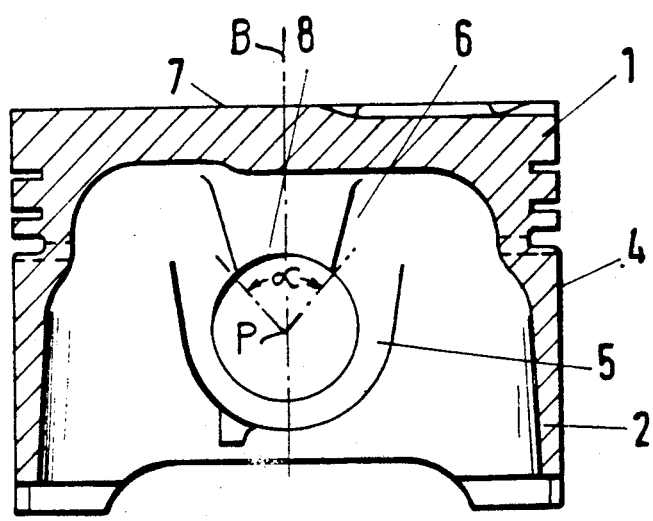
FIG. 3 is a sectional view showing the light alloy piston and taken on the plane which includes the piston axis and extends in the direction which is at right angles to the axis of the piston pin.

The integral light alloy piston 3 constitutes a box-type piston and consists of the head 1 and the skirt 2. The skirt is formed in its peripheral surface 4 with a recess on both sides of the plane B which contains the axis A of the piston and the axis P of the piston pin 10 and the peripheral surface 4 of the skirt is inwardly offset in the direction of the axis of the piston pin. The piston pin bosses 5 are integral with the skirt 2 and are connected to the top 7 of the piston by an inelastic block support 5 having a height or elongation length n of 14% of the piston diameter. The piston can hold a connecting rod having a width w amounting to 15 to 50% of the piston diameter. Two apex portions 8 of the bosses are disposed on both sides of the plane which includes the axis of the piston pin and the axis of the piston and have segments which include an angle $\alpha$ of 75 degrees compared to a conventional light alloy piston having a block support for the piston pin bosses. The piston pin bosses 5 are outwardly setback below said segments by 40% of the length l in which the piston pin is supported. The transitional portions 9 between the outwardly setback segments of the piston pin bosses 5 and said segments of the piston pin bosses 5 in the top apex portions 8 of the bosses are rounded with a radius of 12 mm.

What is claimed is:

1. A light alloy piston for internal combustion engines, comprising: a piston head having a piston axis; a piston skirt extending downwardly from the piston head and having a given diameter; two opposed piston pin bosses integrated into the piston skirt and having two piston pin bores with a common bore axis and a bore diameter amounting to 20 to 85% of the given diameter and two internal end faces spaced apart by a given width amounting to 15 to 50% of the given diameter, wherein each piston boss comprises apex portions above the end faces having facing surfaces extending radially inwardly of the end faces and side surfaces disposed about a plane which includes the bore axis and the piston axis and forming a segment including an angle of less than 180°.

2. The piston according to claim 1, wherein the piston bosses have an effective length for contacting a piston pin and wherein the end faces are set back from the facing surfaces by 5 to 80% of the effective length.

3. The piston according to claim 1, wherein the segment includes an angle of 70 to 150°.

4. The piston according to claim 1, wherein the segment includes an angle of 76° to 96°.

* * * * *